(12) United States Patent
Cheung

(10) Patent No.: US 9,226,485 B2
(45) Date of Patent: Jan. 5, 2016

(54) FISHING REEL AND DRIVE MECHANISM THEREFOR

(71) Applicant: Heligear Engineering (H.K.) Co. Ltd, Kwai Chung, N.T., Hong Kong (CN)

(72) Inventor: Chung Cheung, Hong Kong (CN)

(73) Assignee: Heligear Engineering (H.K.) Co. Ltd, Kwai Chung, N.T., Hong Kong (CN)

( * ) Notice: Subject to any disclaimer, the term of this patent is extended or adjusted under 35 U.S.C. 154(b) by 81 days.

(21) Appl. No.: 14/138,548

(22) Filed: Dec. 23, 2013

(65) Prior Publication Data

US 2015/0173336 A1 Jun. 25, 2015

(51) Int. Cl.
*A01K 89/01* (2006.01)

(52) U.S. Cl.
CPC ...................................... *A01K 89/01* (2013.01)

(58) Field of Classification Search
CPC ........... A01K 89/0183; A01K 89/0184; A01K 89/01902; A01K 89/01
USPC .......................................... 242/249, 255, 263
See application file for complete search history.

(56) References Cited

U.S. PATENT DOCUMENTS

| 2,009,915 | A | * | 7/1935 | Davis | 74/462 |
| 2,305,835 | A | * | 12/1942 | Woods | 74/459.5 |
| 4,416,428 | A | * | 11/1983 | Noda | 242/241 |
| 5,163,826 | A | * | 11/1992 | Cozens | 418/170 |
| 8,851,869 | B2 | * | 10/2014 | Oono et al. | 418/61.3 |
| 2002/0130209 | A1 | * | 9/2002 | Noda et al. | 242/279 |
| 2004/0021022 | A1 | * | 2/2004 | Amano et al. | 242/249 |
| 2004/0124299 | A1 | * | 7/2004 | Tsutsumi et al. | 242/249 |
| 2012/0097779 | A1 | * | 4/2012 | Inoue | 242/249 |
| 2013/0149180 | A1 | * | 6/2013 | Oono et al. | 418/61.3 |
| 2014/0084096 | A1 | * | 3/2014 | Inoue | 242/249 |

* cited by examiner

*Primary Examiner* — Emmanuel M Marcelo
(74) *Attorney, Agent, or Firm* — Alix, Yale & Ristas, LLP

(57) ABSTRACT

A fishing reel employs a driving mechanism having a cooperative pinion gear and a face gear. The face gear has a tooth form with a cross-section wherein the cross-section of the inner pitch portion is less than the cross-section of an outer pitch portion. The pinion gear effectively engages the inner pitch portion less than an outer pitch portion to provide a more uniform distribution of torque and to improve the wearing rate of the gear mechanism.

8 Claims, 5 Drawing Sheets

FISHING REEL AND DRIVE MECHANISM THEREFOR

BACKGROUND

This invention relates generally to fishing reels having a gear mechanism that comprises a cooperative pair of a face gear and a cylindrical helical pinion to transmit and redirect rotational force. More particularly, this disclosure relates to an improvement of the helical pinion gear of a spinning fishing reel such that the contact surface characteristics between the gears is reduced, and the loading is distributed more effectively within the teeth to thereby improve the life span of the gears.

For a typical spinning fishing reel, the spool and rotor are located at the front of the reel frame. When the handle is rotated, the rotor will rotate around the spool and the spool will be oscillated in the axial direction. The fishing line will then wrap on the spool through the fishing line guide of the rotor.

The rotor drive mechanism includes a face gear and a pinion gear with helical gear teeth for transmitting rotation of a handle to the rotor.

The gear mechanism generally includes a set of gears relationally positioned to allow interaction between the gear surfaces. The operating characteristics and life span of the gears are generally important factors to be considered when developing a fishing reel mechanism. This is because deterioration of the gears results in poor reel performance and a jiggling force will be generated from the gear interactions.

For the typical spinning reel, the shaft of rotation centers of the handle shaft and the rotor are perpendicular to each other in an offset state. The cross-sectional area of each face gear tooth is smaller in inside pitch and larger in the outside pitch such that the tooth strength is weaker at the inside pitch and larger at the outside pitch.

The durability of the gears directly relates to the function of the reel since any deterioration in the gears result in gear back lash and/or different than normal operational characteristics. Compensation mechanisms are desired to rectify the situation.

SUMMARY

Briefly stated, a modification of the shape of the cylindrical helical pinion reduces the contact area to the face gear at the inner pitch region, such that the wearing rate in the inner pitch region will be decreased. At the same time, the loading will be distributed uniformly and the durability will be improved.

A fishing reel comprises a spool, a rotor which rotates about the spool and a driving mechanism. The driving mechanism rotates a driven gear and causes the rotor to rotate and the spool to axially reciprocate for winding a line onto the spool. The mechanism comprises a pinion gear which engages a face gear. The face gear has a plurality of teeth with a tooth form with a cross-section wherein the cross-section of the inner pitch portion is less than an outer pitch portion. The pinion gear engages the inner pitch portion to a lesser extent in terms of contact area than the outer pitch portion.

The pinion gear has a first portion and axially spaced second portion. The second portion has a smaller diameter than the first portion. In one embodiment the pinion gear is a series of axial portions adjacent an end which have a progressively smaller diameter in accordance with the portions being axially closer to the end. The face gear and the pinion gear each have a helical cut configuration.

A driving mechanism for a fishing reel comprises a face gear which rotates about a first axis and a pinion gear which engages the face gear and rotates about a second axis perpendicular and offset from said first axis. The face gear has a plurality of teeth having a tooth form with a cross-section wherein the cross section of a radial inner pitch portion is less than the radial outer pitch portion. The pinion gear has a series of axial portions adjacent an end which portions have a progressively smaller diameter in accordance with the portions being closer to the end. The inner pitch portion of the face gear is engaged less than the outer pitch portion of the face gear.

DETAILED DESCRIPTION

Figure 1:
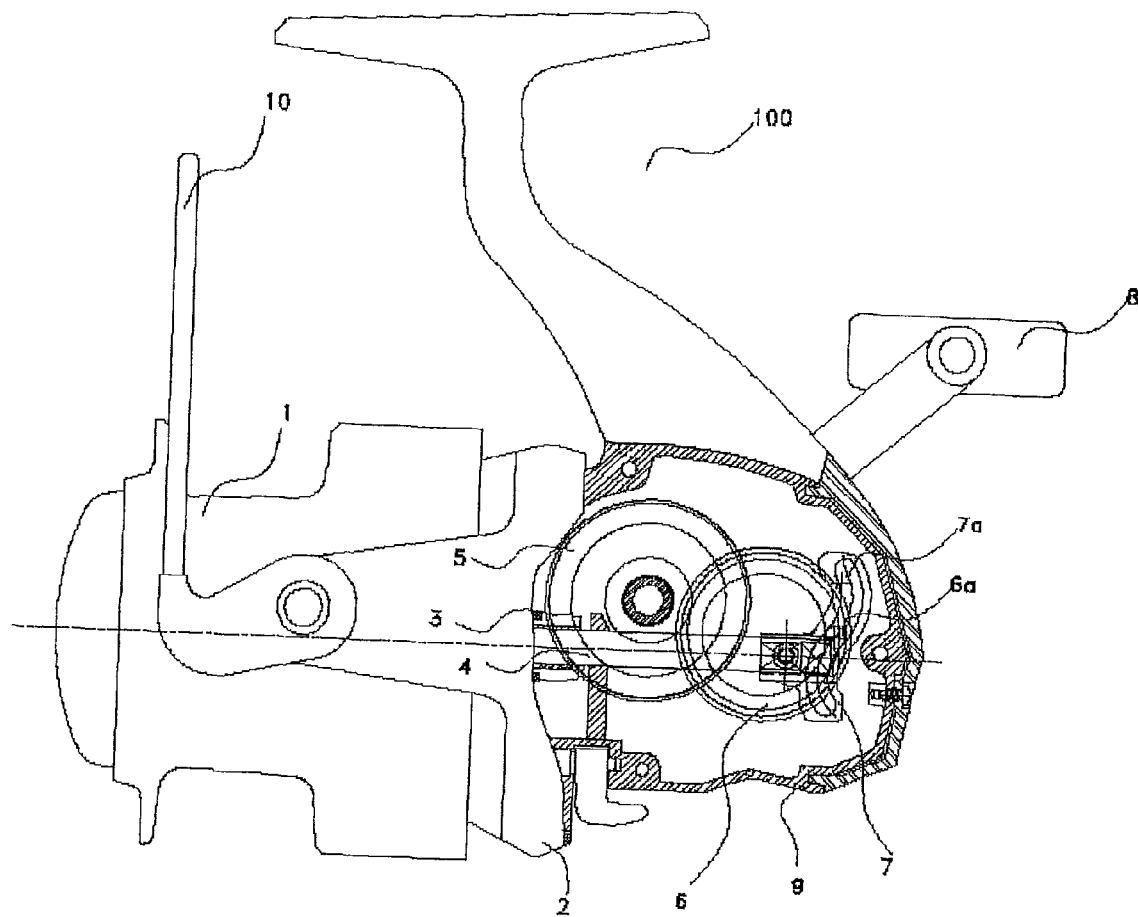
FIG. 1 shows a spinning fishing reel incorporating a helical gear assembly.
Figure 2:
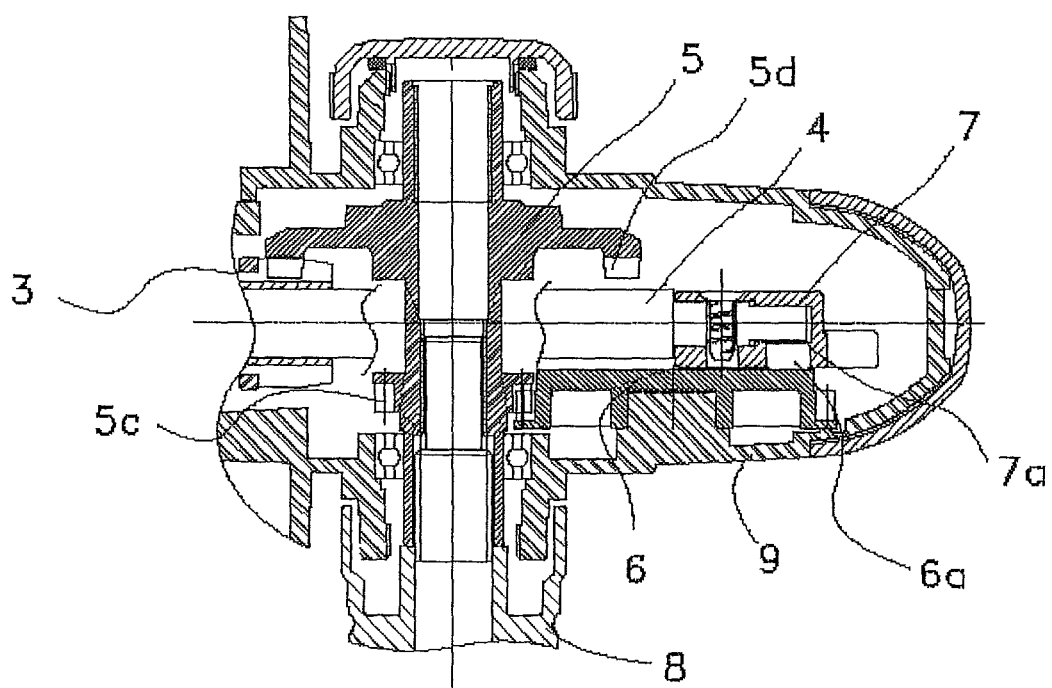
FIG. 2 shows a cross-sectional side view of a spinning fishing reel and the helical gear assembly.
Figure 3:
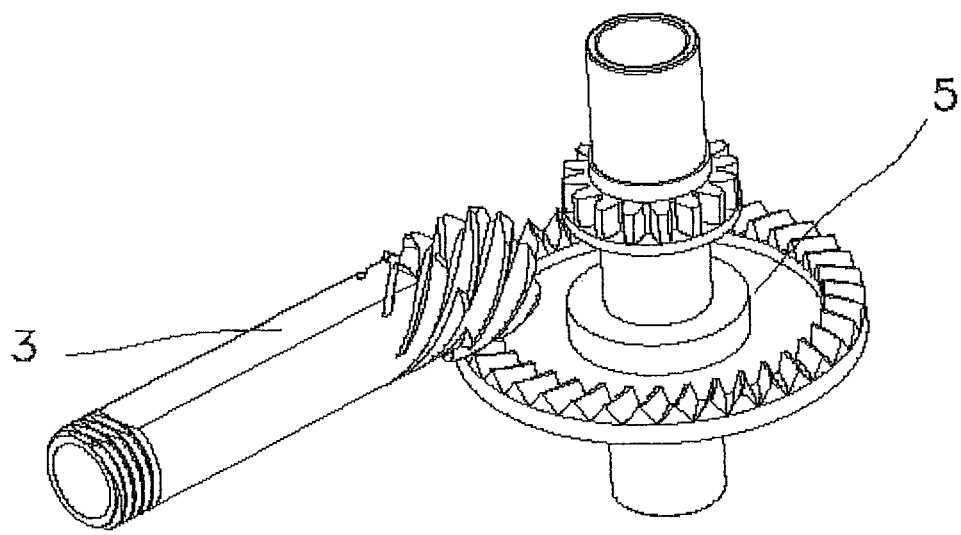
FIG. 3 shows a perspective view of a fishing reel which incorporates a helical cut pinion gear and helical cut face gear.
Figure 4:
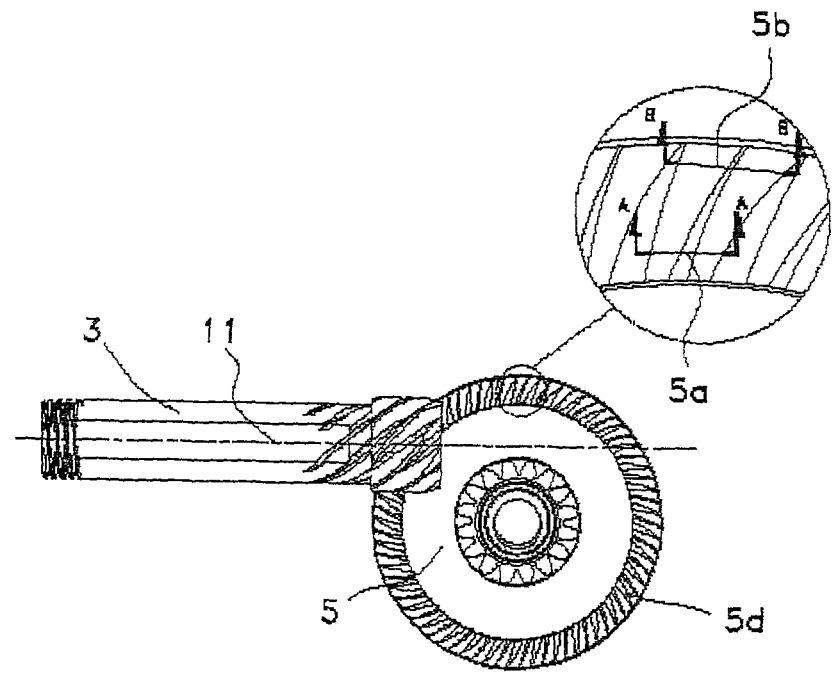
FIG. 4 shows a bottom view of the helical gear assembly in the fishing reel.

With reference to the drawings wherein like numerals represent like parts throughout the several figures, a fishing reel 100 comprises a spool 1 on which fishing line can be stored at the front of the fishing reel 100. It also comprises a rotor 2 which comprises a bail arm 10. The bail arm 10 acts as a line guide to guide a fishing line onto the spool 1 when it is being wound onto the spool 1. The rotor 2 is provided on the front of a reel body 9 which encases the driving mechanism of the fishing reel 100.

The driving mechanism comprises a face gear 5 which is connected to a handle 8. When the handle 8 is rotated by a user, this causes the face gear 5 to rotate. The face gear 5 is in engagement with a pinion 3 which is connected to the rotor 2. The pinion 3 and the face gear 5 constitute a cooperative helical gear assembly. Rotation of the face gear 5 about its axis causes the pinion 3 to rotate about its axis which is perpendicular to the axis of the face gear 5. When the pinion 3 is rotated, the rotor 2 rotates.

Figure 6A:
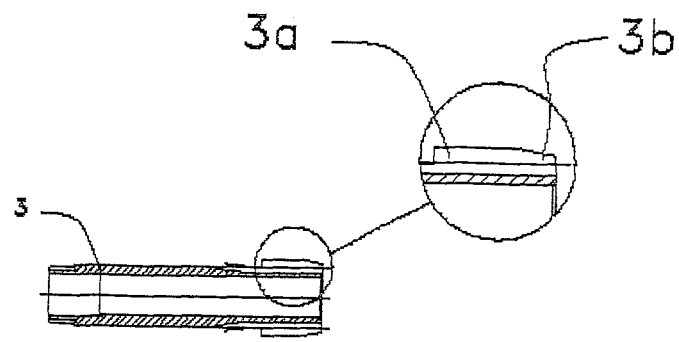
FIG. 6a and FIG. 6b show a shape modification design of the pinion gear of the helical gear assembly in the fishing reel.
Figure 6B:
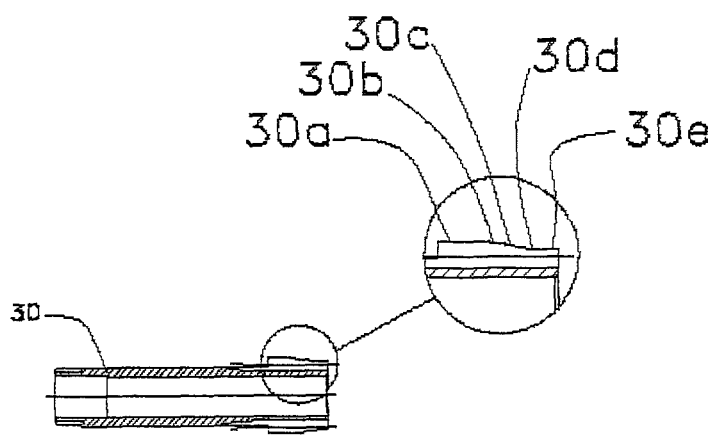
Figure 7:
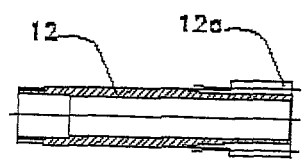
FIG. 7 shows a conventional cylindrical helical pinion gear in a fishing reel.

By machining or molding a cone-type or stepped shape, as shown in FIGS. 6a and 6b, in the front of the pinion gear such that the contact area to the face gear is reduced in the inner pitch region, the torque would transmit and more evenly distribute to each tooth along the radial direction of the face gear. Thus, the gear wearing rate will be decreased in the inner pitch region and durability will be improved.

The driving mechanism as shown on FIG. 1 contains the face gear 5 that is connected to the pinion 3. The gear 5c in face gear 5 is also used to drive a gear 6 such that when the face gear 5 rotates, the driven gear 6 rotates. The driven gear 6 comprises a protrusion 6a which engages in a slot 7b in a bracket 7. The protrusion 6a is attached to the driven gear 6 and thus rotates with driven gear 6 as it is rotated. The rotation of the protrusion 6a causes the bracket 7 to reciprocate linearly in a backwards to forwards direction. The bracket 7 is fixed to the shaft 4 so that as the bracket 7 reciprocates linearly, the shaft 4 is caused to reciprocate. As described above, the spool 1 is caused to reciprocate axially.

When a user turns the handle 8, the rotor 2 is caused to rotate, as described above, which winds a fishing line onto the spool 1. Simultaneously, the winding of the handle 8 causes the driven gear 6 to rotate due to its engagement with the face gear 5. Rotation of the driven gear 6 causes the protrusion 6*b* to rotate which, due to the slot 7*b*, causes the bracket 7 to reciprocate axially. This causes the shaft 4 to reciprocate axially which causes spool 1 to reciprocate to thereby uniformly distribute the fishing line on the spool 1 as it is wound in.

Figure 5A:
FIG. 5 shows an enlarged view of a tooth portion shown in FIG. 4.
Figure 5B:
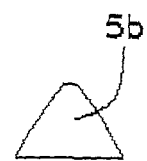

The face gear 5 could be fabricated by casting, forging or cutting. The tooth form of the face gear is shown in FIG. 5. The cross-section 5*a* is smaller than 5*b* so that the strength in the inner pitch side is weaker.

The spinning reel for fishing employing such a face gear is subject to a large load applied to the face gear while fighting with the fish, so that strength is very important in the face gear.

The pinion gear 3 and the face gear 5 are engaged at axle 11, by using the modification pinion gear 3 wherein the 3*a* and 3*b* part of the pinion 3 is engaged to the 5*a* and 5*b* part of the face gear 5. The engagement time of the part 3*b* of pinion gear 3 to the relatively weakened part 5*a* of the face gear 5 is reduced and the loading is mainly transmitted by 5*b* part of face gear 5, such that the wearing rate of the part 5*a* will be decreased and the life of face gear 5 will be increase.

The pinion gear 30 and face gear 5 are engaged at axle 11. By using the modification pinion gear 30, the 30*a*, 30*b*, 30*c*, 30*d* and 30*e* part of the pinion 30 is engaged to the 5*a* and 5*b* part of the face gear 5. The engagement time of the 30*c*, 30*d*, 30*e* part of pinion 30 to the relatively weakened part 5*a* of the face gear 5 is reduced and the loading is mainly transmitted by the 5*b* part of face gear 5 such that the wearing rate of the part 5*a* will be decreased and the life of face gear 5 will be increased.

In general, by contrast, when using the original prior art pinion gear 12 only with a cylindrical part 12*a*, the tooth 5*a* of face gear 5 will become damaged and wear faster than the tooth surface 5*b*. This interaction will cause the decline of reel performance.

The invention claimed is:

1. A fishing reel comprising:
   a spool;
   a rotor which rotates about the spool; and
   a driving mechanism rotating a driven gear and causing the rotor to rotate and the spool to axially reciprocate for winding a line onto the spool comprising a pinion gear which engages a face gear, said pinion gear having a series of axial portions adjacent an end which have a progressively smaller diameter in accordance with the portions being axially closer to the end, said face gear having a plurality of teeth with a tooth form with a cross-section wherein the cross section of an inner pitch portion is less than an outer pitch portion, and the pinion gear engages the inner pitch portion in a contact area less than the outer pitch portion.

2. The fishing reel of claim 1 wherein the pinion gear has a first portion and an axially spaced second portion and the second portion has a smaller diameter than the first portion.

3. The fishing reel of claim 1 further comprising a handle which is rotatable for rotating the driven gear and the face gear.

4. The fishing gear of claim 1 wherein each said tooth form has a substantially identical configuration.

5. The fishing gear of claim 1 wherein the face gear and the pinion gear each have a helical cut configuration.

6. A driving mechanism for a fishing reel comprising:
   a face gear which rotates about a first axis and has a plurality of teeth having a tooth form with a cross-section wherein the cross-section of a radial inner pitch portion is less than a radial outer pitch portion; and
   a pinion gear which rotates about a second axis offset from said first axis and perpendicular to said first axis wherein the pinion gear has a series of axial portions adjacent an end, which portions have a progressively smaller diameter in accordance with the portions being closer to the end and said pinion gear engages the face gear such that the radial inner pitch portion of the face gear is engaged in a contact area less than the outer radial pitch portion of the face gear.

7. The fishing reel driving mechanism of claim 6 wherein said face gear and said pinion gear each have a generally helical cut configuration.

8. The fishing gear of claim 6 wherein each said tooth form has a substantially identical configuration.

\* \* \* \* \*